US009011128B2

(12) United States Patent
Sanderson

(10) Patent No.: US 9,011,128 B2
(45) **Date of Patent: *Apr. 21, 2015**

(54) ASPECTS OF A PRESS ASSEMBLY

(71) Applicant: Elizabeth-Hata International, North Huntington, PA (US)

(72) Inventor: Richard A. Sanderson, McKeesport, PA (US)

(73) Assignee: Elizabeth-Hata International, North Huntington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,945

(22) Filed: Oct. 21, 2013

(65) Prior Publication Data

US 2014/0041539 A1 Feb. 13, 2014

Related U.S. Application Data

(63) Continuation of application No. 13/168,449, filed on Jun. 24, 2011, now Pat. No. 8,562,322, which is a continuation of application No. 12/234,249, filed on Sep. 19, 2008, now Pat. No. 8,062,015.

(51) Int. Cl.

| | |
|---|---|
| ***B29C 43/08*** | (2006.01) |
| ***B29C 31/08*** | (2006.01) |
| ***B30B 15/30*** | (2006.01) |
| ***B30B 11/08*** | (2006.01) |
| ***B30B 11/34*** | (2006.01) |

(52) U.S. Cl.

CPC ................ *B30B 15/30* (2013.01); *B30B 11/08* (2013.01); *B30B 11/34* (2013.01)

(58) Field of Classification Search

CPC .......... B30B 11/08; B30B 11/34; B30B 15/30
USPC ............. 425/110, 123, 123.1, 128, 344, 345; 264/109, 276

See application file for complete search history.

(56) References Cited

U.S. PATENT DOCUMENTS

| | | | |
|---|---|---|---|
| 2,727,473 | A | 12/1955 | Wolff et al. |
| 2,849,965 | A | 9/1958 | Stott |
| 2,879,724 | A | 3/1959 | Wyatt, Jr. et al. |
| 2,946,298 | A | 7/1960 | Doepel et al. |
| 2,955,393 | A | 10/1960 | Muller et al. |
| 2,966,125 | A | 12/1960 | Stott |
| 3,371,136 | A | 2/1968 | Johannsen |
| 3,849,041 | A | 11/1974 | Knapp |
| 5,004,413 | A | 4/1991 | Stopforth |
| 5,088,915 | A | 2/1992 | Korsch et al. |
| 5,958,467 | A | 9/1999 | Coble et al. |

(Continued)

FOREIGN PATENT DOCUMENTS

| | | |
|---|---|---|
| DE | 1095462 | 12/1960 |

(Continued)

*Primary Examiner* — Joseph S Del Sole
*Assistant Examiner* — Thu Khanh T. Nguyen
(74) *Attorney, Agent, or Firm* — Middleton & Reutlinger; Robert H Eichenberger; Scott W Higdon

(57) ABSTRACT

An assembly includes a plurality of core retention elements for transferring cores to a tablet press turn table. The core retention elements may each include a core receptacle that selectively receives a core. The core retention elements may transfer the core into one of a plurality of die bores in the press turn table.

4 Claims, 11 Drawing Sheets

(56) References Cited

U.S. PATENT DOCUMENTS

| | | | |
|---|---|---|---|
| 6,116,889 | A | 9/2000 | Pagel et al. |
| 6,345,487 | B1 | 2/2002 | Luciano et al. |

FOREIGN PATENT DOCUMENTS

| | | |
|---|---|---|
| DE | 10321754 | 12/2004 |
| EP | 1155811 | 11/2001 |
| GB | 891634 | 3/1962 |
| JP | 59144598 | 8/1984 |

ASPECTS OF A PRESS ASSEMBLY

CROSS-REFERENCE TO RELATED APPLICATIONS

This application is a continuation of currently pending U.S. patent application Ser. No. 13/168,449, filed Jun. 24, 2011 and entitled "Aspects of a Press Assembly," which is a continuation of U.S. Pat. No. 8,062,015 (application Ser. No. 12/234,249, filed Sep. 19, 2008, entitled "Tablet Press Assembly"), both of which are hereby incorporated by reference in their entirety.

BACKGROUND

1. Field of the Invention

The present invention is related generally to a tablet press.

2. Description of Related Art

Presses used for tablet manufacturing are known in the art. Tablet presses wherein an item such as a tablet or core part is placed onto a rotary press die table are also known. For example in some tablet presses, tablet cores are placed within a bed of powder on a rotary press die table and then compressed to create a tablet.

SUMMARY

In a first exemplary embodiment, an internal feed wheel assembly is provided with a tablet insert chute and a rotatable bowl top. The tablet insert chute has an exit aperture. The rotatable bowl top has an inner periphery, a plurality of notches, and a plurality of core feed apertures extending therethrough. The exit aperture is positioned proximal to the inner periphery of the bowl top. Each notch is designed and sized to receive a single tablet and is in communication with the inner periphery and a corresponding core feed aperture.

Another exemplary embodiment provides a transfer assembly having a plurality of core retention elements and at least one core feed aperture. The core retention elements are coupled together to form a loop and positioned in a press assembly so as to be rotatable. Each of the core feed aperture is sized to communicate a tablet core therethrough. At least one the core retention elements is positioned in line with at least one core feed aperture.

Yet another exemplary embodiment provides a press assembly having a plurality of core retention elements connected together to form a loop and positioned in a press assembly so as to be rotatable. The plurality of core retention elements are positioned above a plurality of die bores of a press turntable. A plurality of core retention elements each receives a differing amount of an upper punch.

Still another exemplary embodiment provides press assembly having a tablet insert chute with an exit aperture. The press assembly also has a rotatable bowl top with an inner periphery, a plurality of notches, and a plurality of core feed apertures extending therethrough. The exit aperture of the tablet insert chute is positioned proximal to the inner periphery of the bowl top. Each notch is designed and sized to receive a single tablet and is in communication with the inner periphery and a corresponding core feed aperture. A plurality of core retention elements are also provided. The core retention elements are connected together to form a loop positioned in a press assembly so as to be rotatable. Each core feed aperture is sized to communicate a tablet core therethrough. At least one of the core retention elements is positioned in line with at least one of the core feed aperture. At least one of the core retention elements is positioned above at least one die bore of a die turntable.

Another exemplary embodiment provides a press assembly having a tablet insert chute with an exit aperture. The press assembly is further provided with a rotatable bowl top with an inner periphery, a plurality of notches, and a plurality of core feed apertures extending therethrough. The exit aperture of the tablet insert chute is positioned proximal to the inner periphery of the bowl top. Each notch is designed and sized to receive a single tablet and is in communication with the inner periphery and a corresponding core feed aperture. A plurality of core retention elements is also provided. The core retention elements are connected together to form a loop and positioned in a press assembly so as to be rotatable. A plurality of push pins are provided contacting a push pin cam and in line with at least one notch and corresponding core feed aperture and at least one core retention element. At least one core retention element is positioned above at least one powder bore of a die turntable and at least partially receiving an upper punch. at least one core retention element is positioned above a smooth table surface.

Another exemplary embodiment of the present invention provides a method of transporting tablets in a press assembly. The method provides interiorly feeding a tablet into a notch of a rotating top and temporarily maintaining the tablet in the notch.

Another exemplary embodiment of the present invention provides another method of transporting tablets in a press assembly. The method provides a step of causing one of a plurality of rotating attached core retention elements to be placed in proximity to a core feed aperture in line with a tablet. Another step provides communicating a tablet through said core feed aperture into the core retention element when the core retention element is in proximity to the core feed aperture. The method further provides moving the core retention element above a die bore and communicating the tablet from the core retention element and into the die bore.

Still another exemplary embodiment of the present invention provides method of placing tablets in a die bore of a press turntable. The method provides a step of communicating a tablet into a notch of a rotating top in line with a core feed aperture and causing a core retention element to be momentarily placed in proximity to the core feed aperture. The method further provides a step communicating the tablet from the notch, through the core feed aperture, and into the core retention element when the core retention element is in proximity to the core feed aperture. Another step moves the core retention element above the die bore and communicating the tablet from the core retention element and into the die bore.

Yet another embodiment provides an internal feed wheel assembly for a tablet press assembly having a base portion and a tablet insert chute coupled to the base portion and having an exit aperture. The embodiment is also provided with a bowl top rotatably coupled to the base portion, the bowl top has an upper surface, a lower surface and an inner periphery. A plurality of notches are disposed on the lower surface and in communication with the periphery. A first set of a plurality of apertures extend through the upper surface and are in communication with the plurality of notches. The exit aperture of the tablet insert chute is positioned proximal to the inner periphery of the bowl top. Each of the plurality of notches is geometrically dimensioned to receive a single tablet.

Yet another embodiment provides an internal feed wheel assembly for a tablet press assembly having a base portion with a tablet trap and a tablet insert chute coupled to the base portion. A bowl top is rotatably coupled to the base portion, the bowl top has an upper surface, a lower surface and an inner periphery. A plurality of notches are disposed on the lower surface and in communication with the inner periphery. A first set of a plurality of apertures are provided extending through the upper surface and in communication with the plurality of notches. The tablet trap is positioned proximal to the inner periphery of the bowl top. The tablet insert chute exit aperture is located proximal to both the tablet trap and the inner periphery of the bowl top.

In yet another embodiment, a tablet press assembly is provided having a first base portion, and a second base portion. A tablet insert chute is provided coupled to the first base portion and has an exit aperture. A bowl top is rotatably coupled to the first base portion. The bowl top has an upper surface, a lower surface and an inner periphery. A plurality of notches are disposed on the lower surface and in communication with the inner periphery. A first set of a plurality of apertures extend through the upper surface and are in communication with the plurality of notches. A press turntable is rotatably mounted to the second base portion. The press turn table has multiple upper punches, multiple lower punches, and multiple apertures. Multiple core retention elements are provided, each adapted to move between at least a first position proximal to the bowl top and a second position proximal to the press turntable

BRIEF DESCRIPTION OF THE DRAWINGS

Embodiments of the present invention are illustrated in the following Figures.

DETAILED DESCRIPTION

Figure 1:
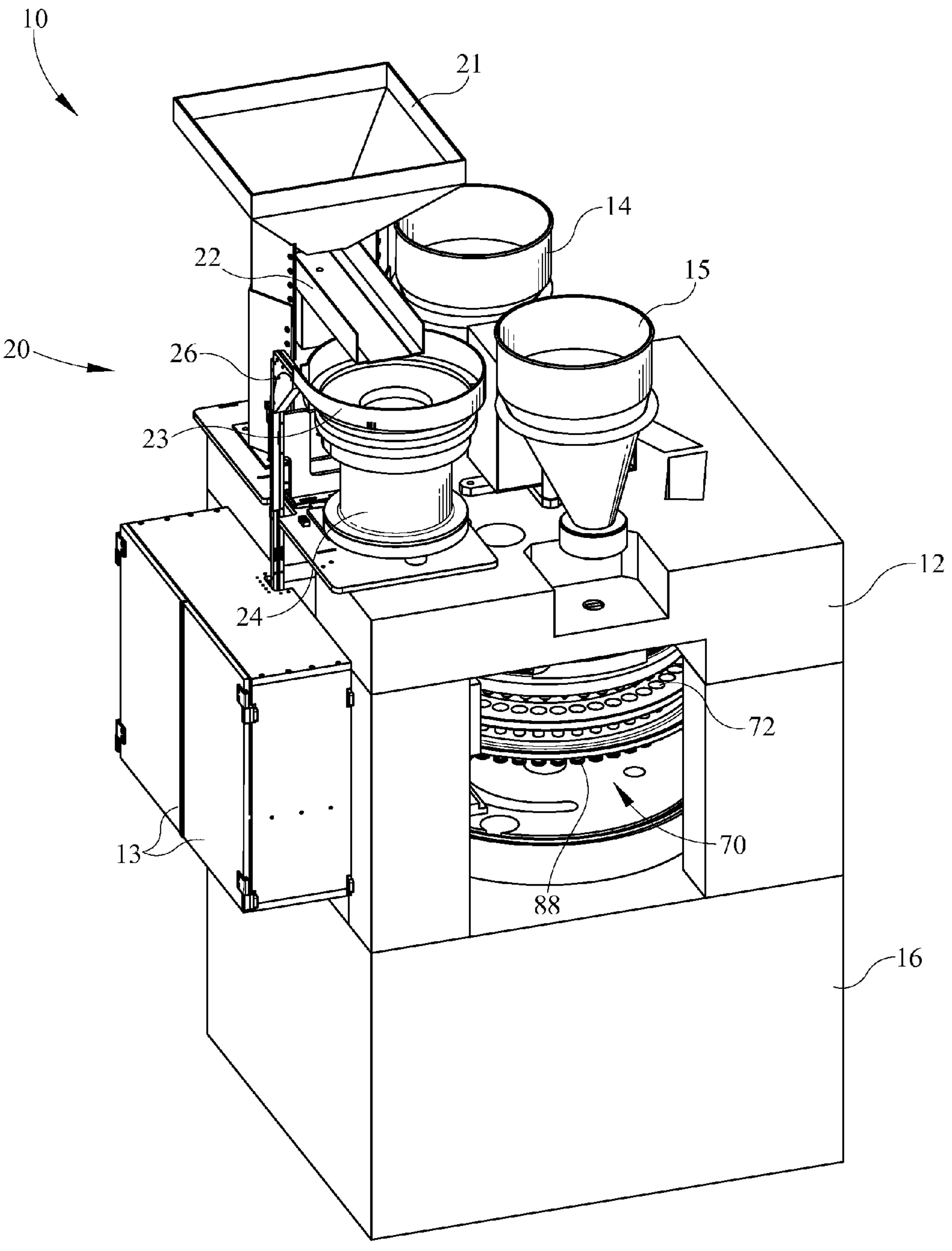
FIG. 1 is a top perspective view of an embodiment of a core press assembly.
Figure 2:
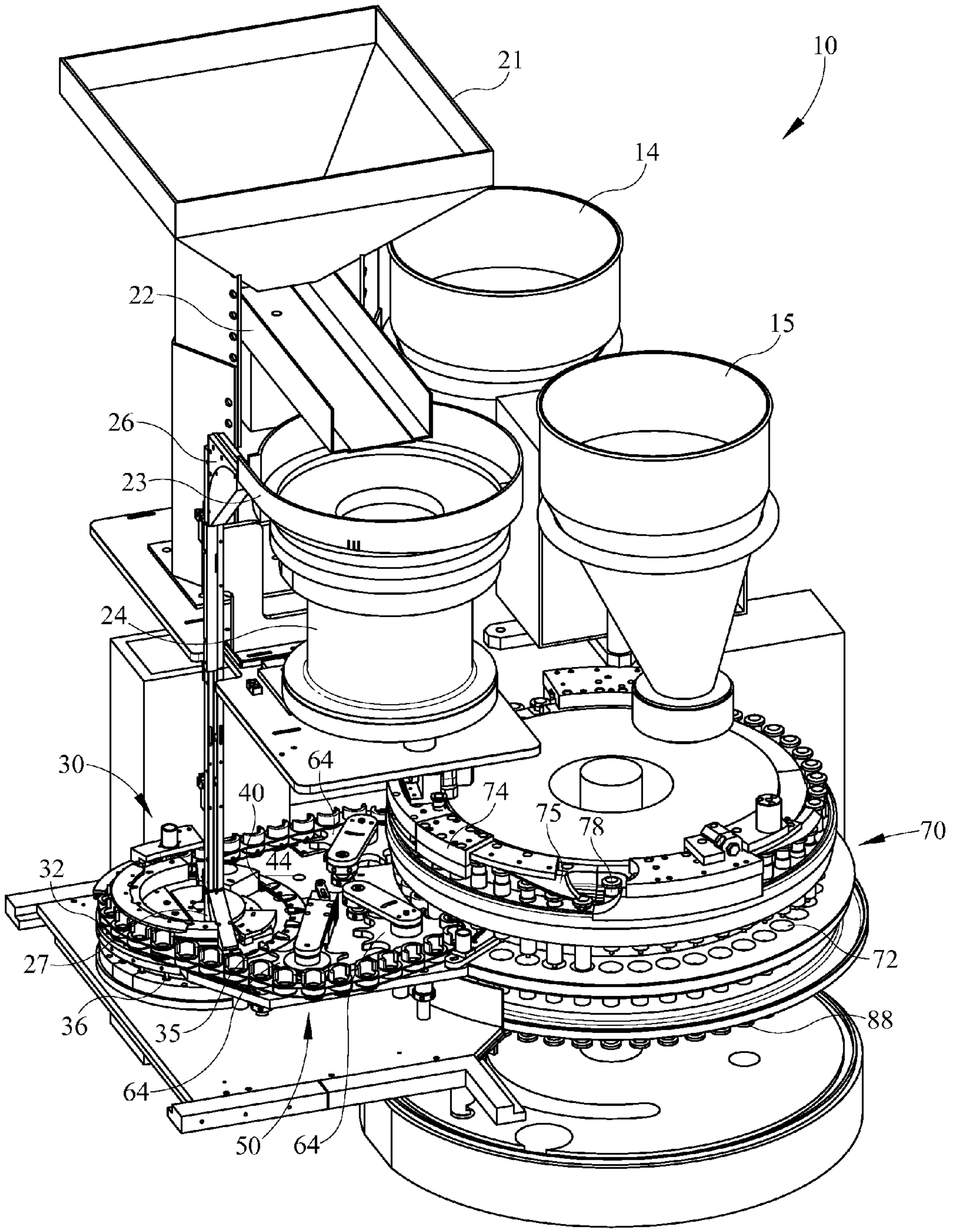
FIG. 2 is a top perspective view of the core press assembly of FIG. 1 with a housing, base, and doors removed.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention and that other alternative mechanical configurations are possible.

Referring now in detail to the drawings, wherein like numerals indicate like elements throughout the several views, there are shown in FIGS. 1-11 various aspects of a core press assembly. Referring to FIG. 1, Core press assembly 10 has an assembly for feeding tablet cores to a tablet insert chute. In some embodiments the assembly for feeding tablet cores is a feeder and vibrator assembly 20, which may be placed in a number of locations, but is preferably located atop housing 12, which sits atop a base 16. Housing 12 and base 16 may take on a number of embodiments. Both are primarily provided for structural support, and may also be provided for safety and/or cleanliness among other things. Optionally, one or more doors 13 attached to housing 12 may be provided for selectively enclosing or accessing constituent parts of core press assembly 10. Also provided in some embodiments are powder feeds 14 and 15 that collect powder and communicate that powder to powder bores 76 of a press turntable 70 both before and after tablet cores are placed in each powder bore 76. Powder may be communicated using tubing (not shown) or the like.

Figure 3:
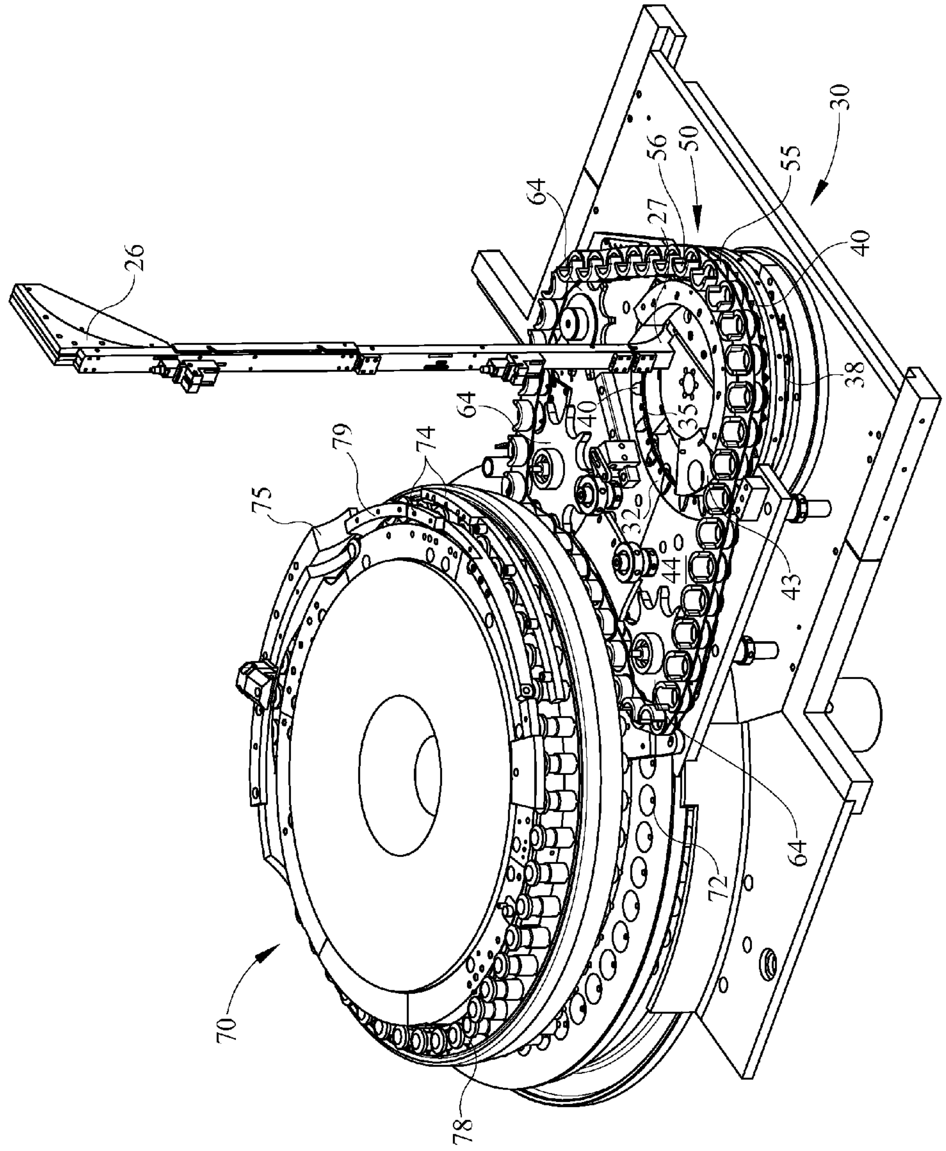
FIG. 3 is a top perspective view showing an internal feed wheel assembly, transfer assembly, a press turntable, a tablet slide, and a tablet insert chute of the core press assembly of FIG. 1.
Figure 4:
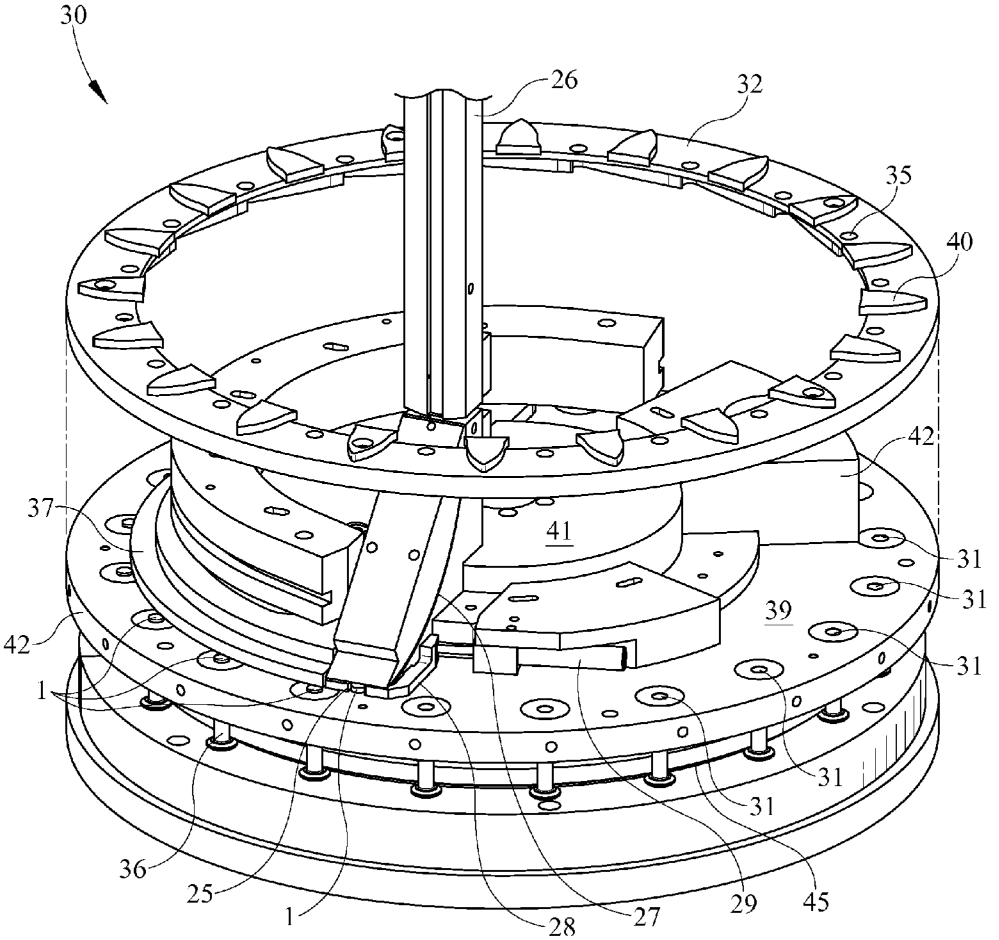
FIG. 4 is a top perspective view of the internal feed wheel assembly of FIG. 3 with a bowl top exploded away and also shows a tablet feed stop and the tablet insert chute and a portion of the tablet slide of FIG. 3.

Referring to FIGS. 1-4, an embodiment of feeder and vibrator assembly 20 is described with more detail. A feeder 21 comprises a generally funnel shaped structure for capturing a plurality of tablet cores and directing them into a feeder chute 22. Feeder chute 22 directs each tablet core into a vibratory bowl feeder 23 that is attached to a vibratory base 24. Vibratory bowl feeder 23 retains a plurality of tablet cores 1. Vibratory base 24 vibrates vibratory bowl feeder 23, thereby moving the tablet cores 1 toward a tablet slide 26 that is in communication with the vibratory bowl feeder 23. Each tablet core 1 is fed one by one into tablet slide 26, continues down tablet slide 26 and eventually reaches a tablet insert chute 27, as best shown in FIG. 4. The tablet insert chute 27 comprises an aperture 25 to transfer tablet cores from the tablet insert chute 27. In some embodiments, the tablet insert chute 27 comprises a tablet feed stop 28 that may transition between a closed and an open position to either prevent tablet cores from exiting tablet insert chute 27 or enable tablet cores to exit tablet insert chute 27, respectively. Tablet feed stop 28 is an arm that interacts with piston 29 to actuate between an open and closed position and selectively block a tablet insert chute aperture 25 of tablet insert chute 27.

With continuing reference to FIG. 4, tablet insert chute aperture 25 is shown with a tablet core 1 therein and with tablet feed stop 28 in the open position. In other embodiments, other tablet feed stops may be provided that either prevent tablet cores from exiting tablet insert chute aperture 25 or enable tablet cores to exit tablet insert chute aperture 25. For example, some embodiments may use a sliding arm or a differently positioned piston 29 than that of the shown embodiment. Tablet feed stop 28 enables the feeding of tablet cores to an internal feed wheel assembly 30 that may be halted for repair, experimentation, troubleshooting, a halt in production, or other reason. Other tablet insert chutes that vary from the shown embodiment may be provided for delivering tablets to internal feed wheel assembly 30. Other constituent parts of feeder and vibrator assembly 20 besides tablet insert chute 27 may likewise vary while still enabling delivery of tablets to internal feed wheel assembly 30.

With reference to FIGS. 3-8, an internal feed wheel assembly 30 is located internal to housing 12 for safety and cleanliness. Internal feed wheel assembly 30 comprises a bowl top 32, a bowl bottom 42, and a base portion 41. The bowl bottom 42 is rotatably mounted to the base portion 41. The bowl top 32 is mounted to the bowl bottom 42. The base portion 41 comprises a tablet trap 37 and a mount 45 for the piston 29. The base portion further comprises a push pin track 45 for a plurality of push pins 36. The push pin track 45 at least partially retains the push pins 36 and guides their movement.

Internal feed wheel assembly 30 receives tablet cores from tablet insert chute 27 or otherwise and transfers those tablet cores to a transfer assembly 50 that may also be located internal to housing 12. In some embodiments, and as will be described in more detail below, internal feed wheel assembly 30 is also driven by transfer assembly 50.

Figure 5:
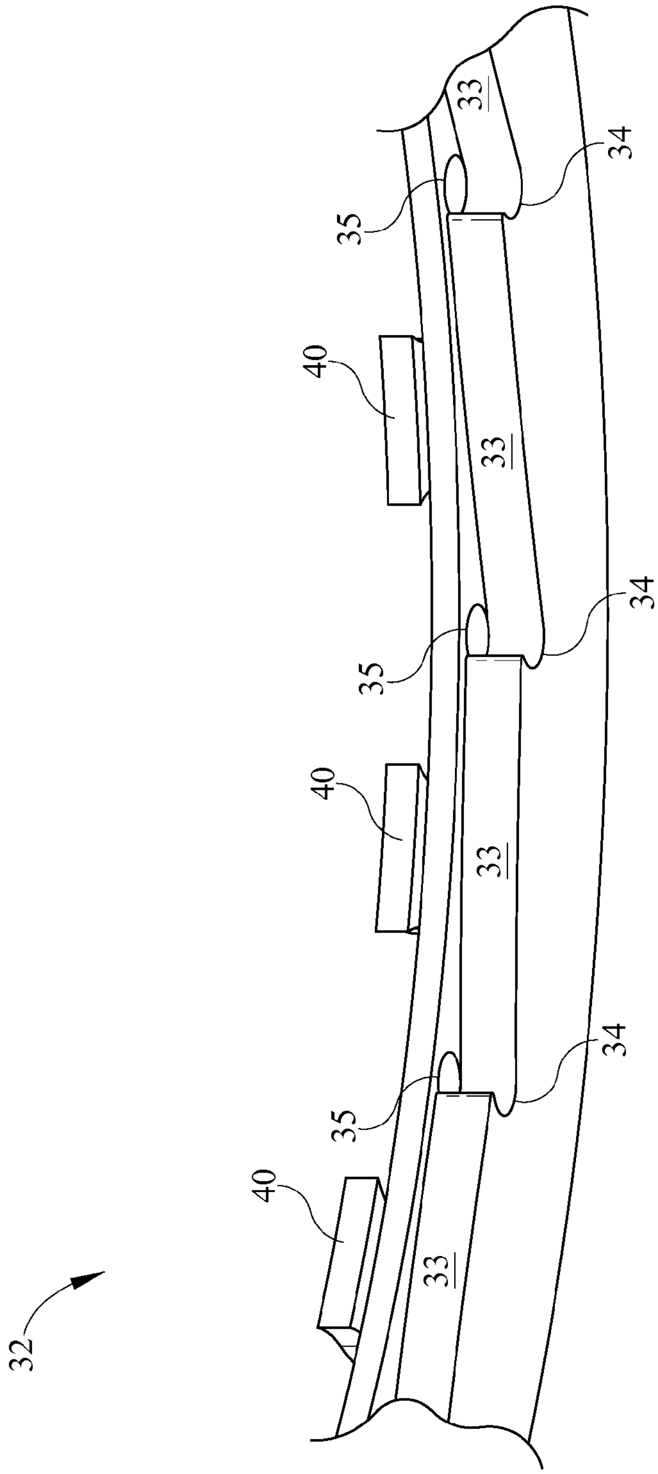
FIG. 5 is a bottom perspective view of a portion of the bowl top of FIG. 4.
Figure 6:
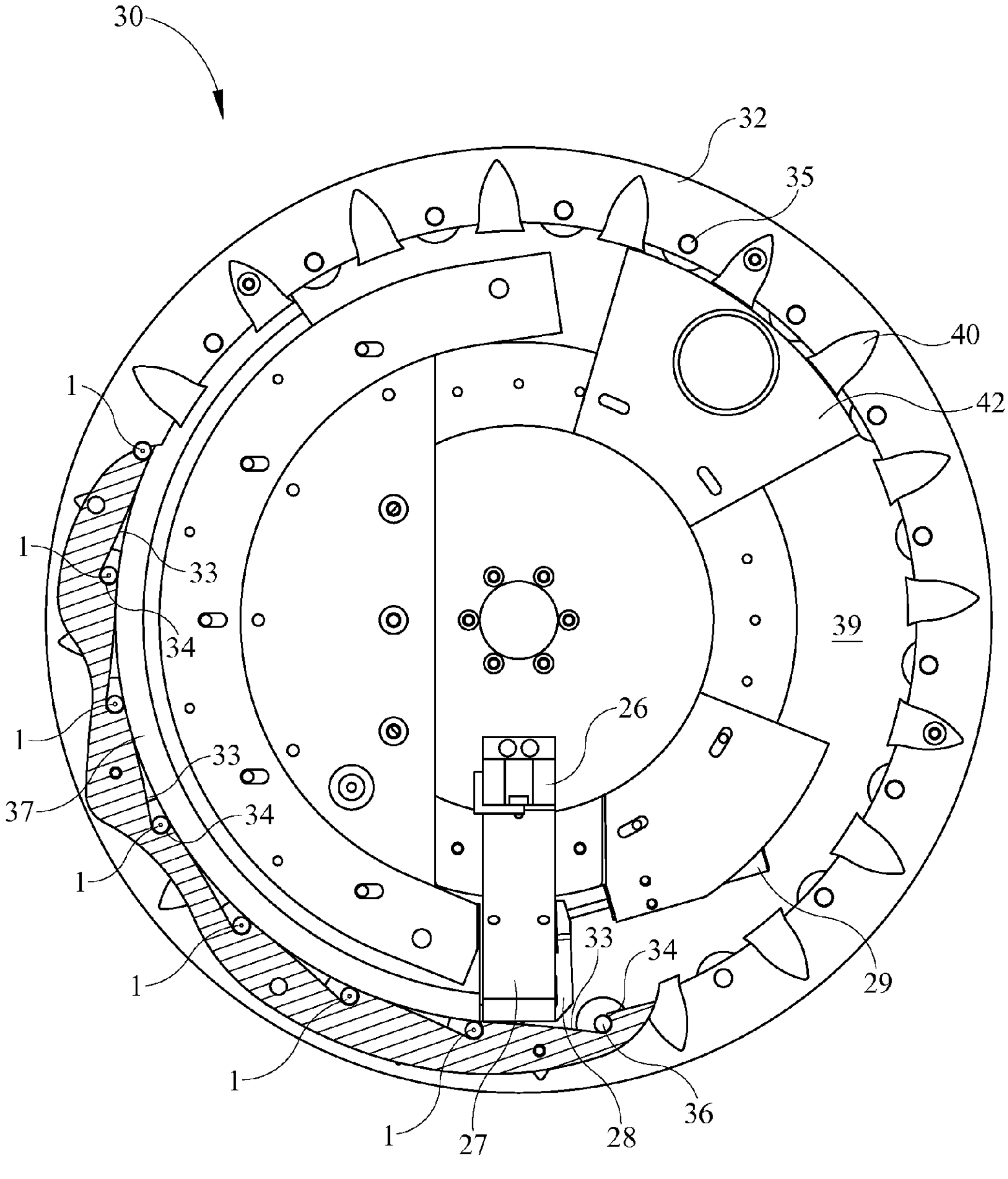
FIG. 6 is a top view of the internal feed wheel assembly of FIG. 3 shown with a partial section of portions of the bowl top.
Figure 7:
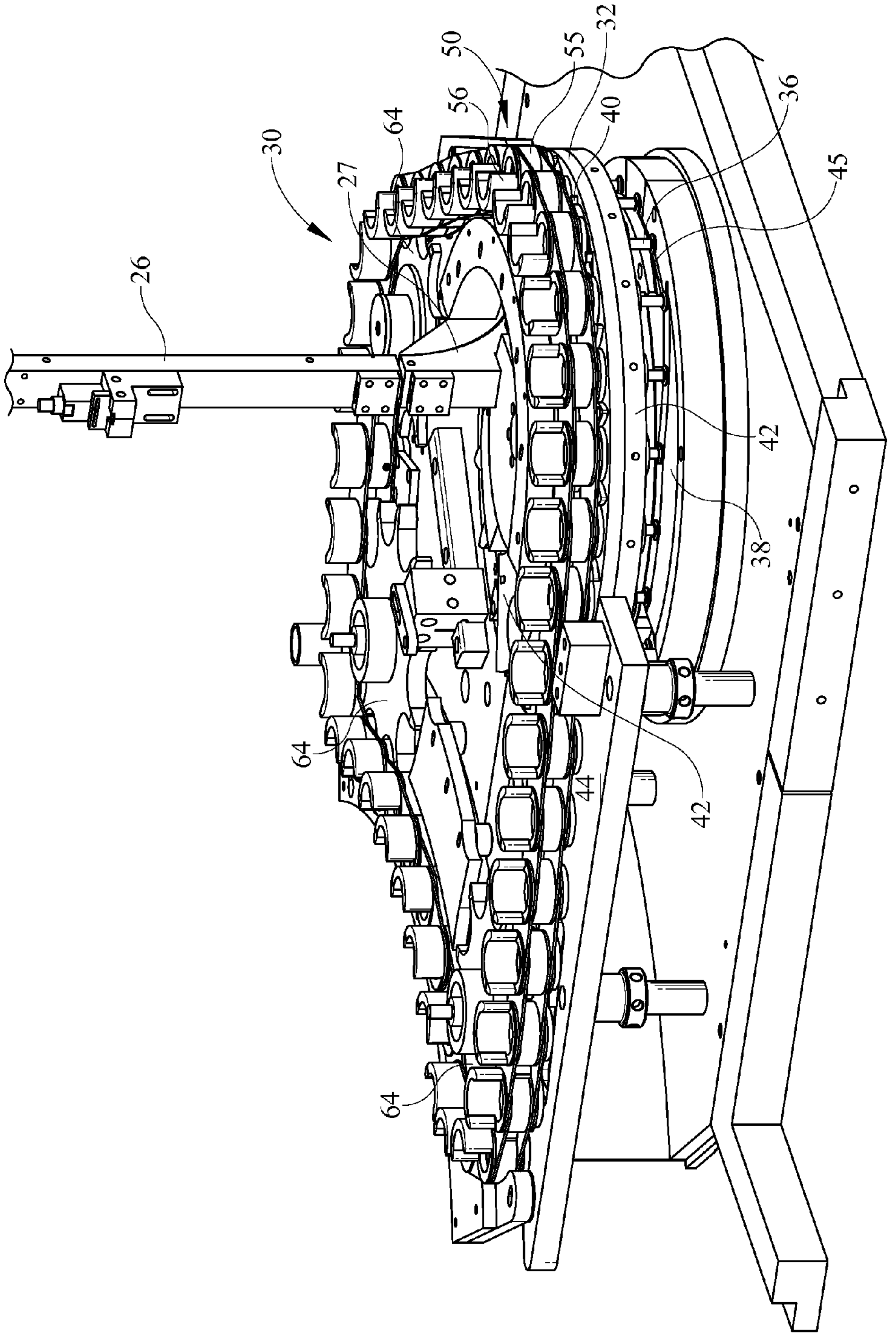
FIG. 7 is a top perspective view of the internal feed wheel assembly and transfer assembly of FIG. 3 and also shows the tablet insert chute and a portion of the tablet slide of the core press assembly of FIG. 4.

As best illustrated with reference to FIGS. 4 and 6, when core press assembly 10 is assembled, the exit of tablet insert chute 27 is in close proximity to an inner periphery of a bowl top 32 of internal feed wheel assembly 30. As shown in FIGS. 5 and 6, bowl top 32 may comprise a plurality of inward facing grooves 33 on its lower surface and in communication with its inner periphery. Each groove 33 may be sloped and extend to a back notch 34. The bowl top 32 further comprises a plurality of core feed apertures 35 that are disposed on the bowl top upper surface and in communication with a corresponding back notch 34. Each back notch 34 is in line with one of a plurality of core feed apertures 35. As shown in FIGS. 4 and 6, core feed apertures 35 are equidistantly spaced and extend radially around bowl top 32. Twenty core feed apertures 35 are provided in the embodiments shown. With reference to FIG. 6, when tablet feed stop 28 is in the open position and bowl top 32 is rotating, as each inward facing groove 33 passes tablet insert chute 27 a single tablet core 1 exits tablet insert chute 27 and is transferred to the back notch 34 corresponding to each inward facing groove 33.

As explained in more detail herein, bowl top 32 and bowl bottom 42 rotate when core press assembly 10 is in use and will be rotating when each tablet core 1 is transferred from tablet insert chute 27 or otherwise to back notch 34. Bowl top 32 and internal feed wheel assembly 30 will rotate in a clockwise direction when viewed from above, although this could easily be varied. The close proximity of the inner periphery of bowl top 32 and the exit of tablet insert chute 27, and the gently sloping nature of inward facing groove 33 ensure that a tablet core will not fully exit tablet insert chute aperture 25 until it is in close proximity to the core feed aperture 35 and notch 34 corresponding to the particular inward facing groove 33. As bowl top 32 rotates, only one tablet core 1 will be transferred to each notch 34.

Figure 8:
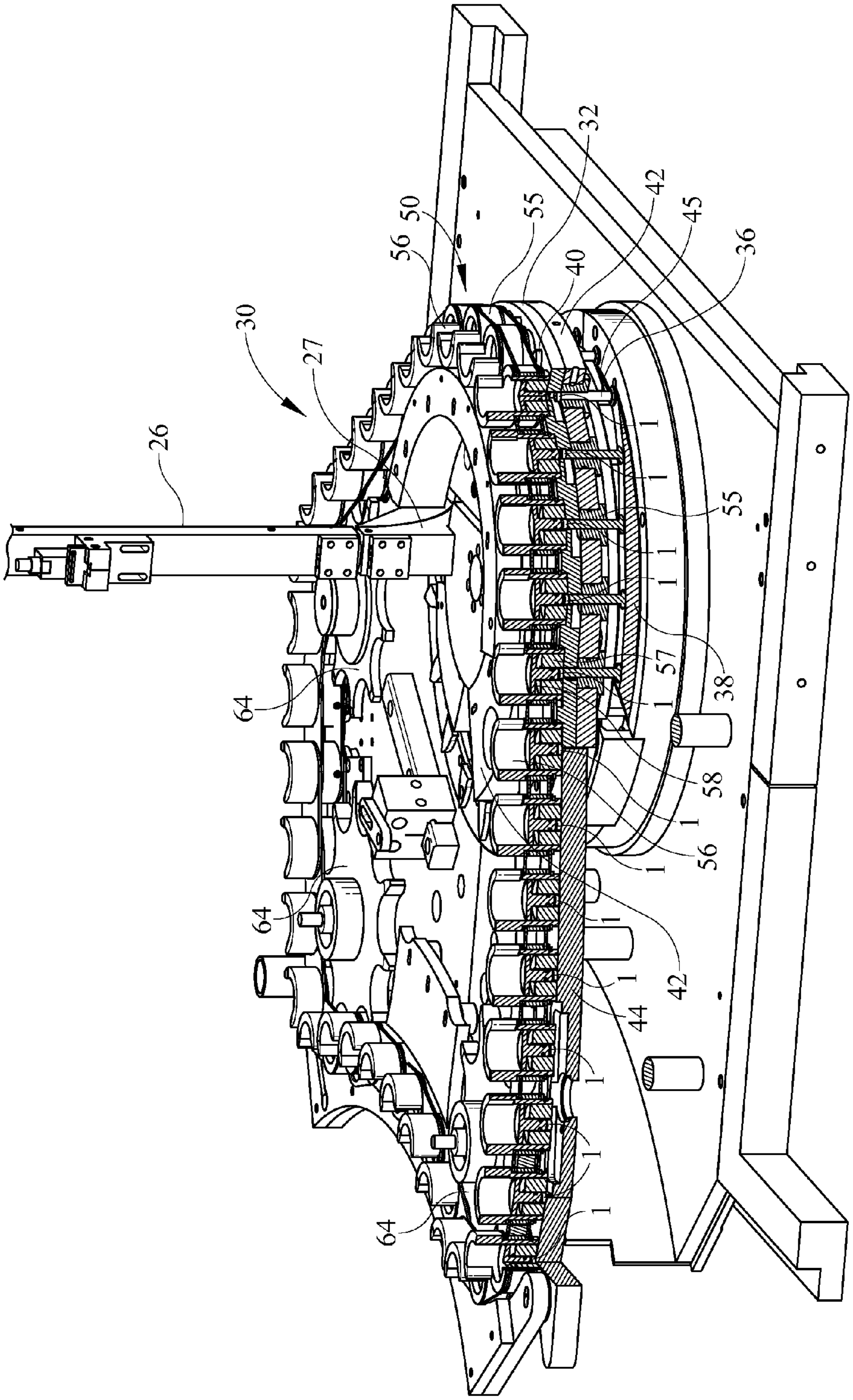
FIG. 8 is a top perspective view of the internal feed wheel assembly, transfer assembly, tablet insert chute, and a portion of the tablet slide of FIG. 3, shown with a partial section of the internal feed wheel assembly and transfer assembly.

Referring to FIGS. 4, 6, and 8, each tablet core 1 will be maintained in notch 34 of inward facing groove 33 below a core feed aperture 35 by virtue of a centrifugal force that results from the rotation of bowl top 32, and also by virtue of a tablet trap 37. Tablet trap 37 originates near tablet insert chute 27 and extends partially around internal feed wheel assembly 30 such that it is in close proximity to the inner periphery of bowl top 32. Tablet trap 37 ensures each tablet core 1 is maintained in its corresponding notch 34 from the time it exits tablet insert chute 27 until it is transferred to transfer assembly 50. In some embodiments, a surface 39 is also provided below bowl top 32 and a plurality of push pins 36 extend at least partially through surface 39. Bowl top 32, surface 39, and plurality of push pins 36 are coupled to each other. Portions of each push pin 36 extend through apertures 31 in surface 39 to access notch 34 and core feed aperture 35. Surface 39 and the plurality of push pins 36 move in synchronization with the bowl top 32, such that a given push pin 36 is always in line with a corresponding notch 35 and core feed aperture 34. The push pins 36 are retained between the push pin track 45 and their interaction with the push pin apertures 31.

Figure 9:
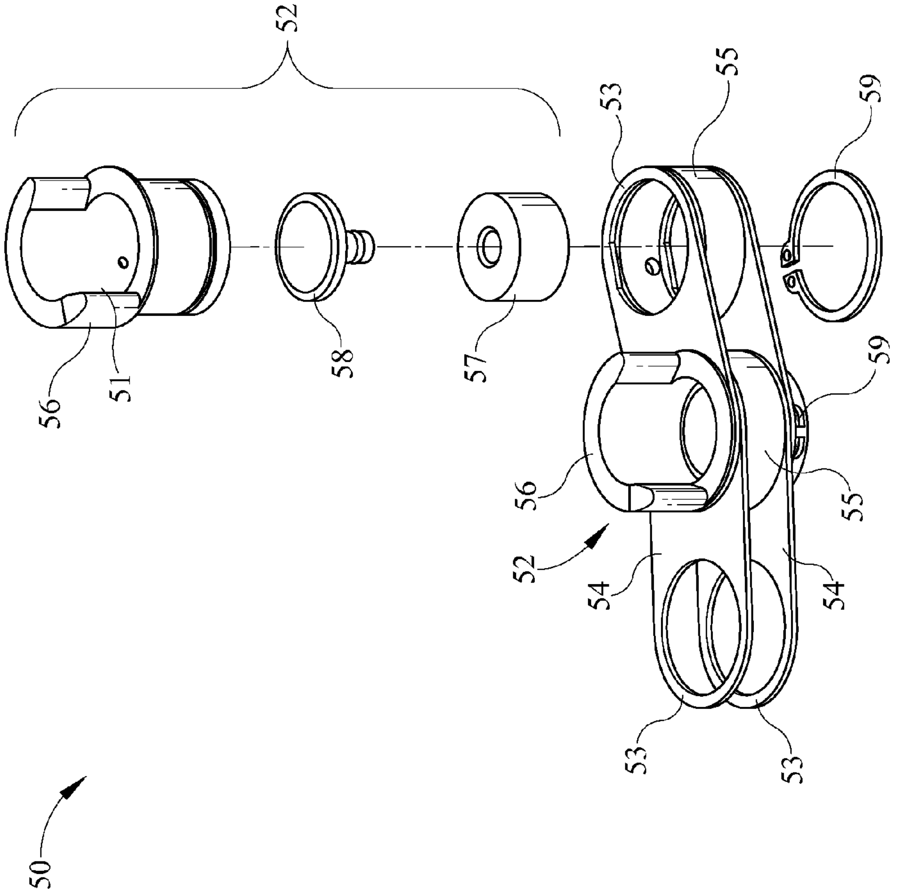
FIG. 9 is top perspective view of a portion of the transfer assembly of FIG. 3 with one core retention element and chain spacer removed from a pair of apertures of a belt, one core retention element in its assembled state in a pair or apertures of a belt with a chain spacer and snap ring, and one core retention element and a snap ring exploded away from a pair of apertures of a belt with a chain spacer.

Referring now to FIGS. 8 and 9, a transfer assembly 50 is also provided comprising a plurality of core retention elements 52 that are coupled to one another. Transfer assembly 50 forms a continuous loop and is installed in core press assembly 10 such that core retention elements 52 may interact with at least a portion of bowl top 32, as well as die bores 72 and upper punches 78 of a press turntable 70 (shown in FIG. 3). In some embodiments, transfer assembly 50 moves through interaction of upper punches 78 and transfer cogs 56. As will be explained in more detail below, as upper punches 78 are rotating, they are inserted into and contact transfer cogs 56 to, among other things, move transfer assembly 50 and transfer any tablet core retained by core retention element 52 into a powder bore 76. This interaction between transfer cogs 56 and upper punches 78 moves transfer assembly 50 substantially in synchronization with upper punches 78.

In the embodiments shown in FIGS. 8 and 9, core retention elements 52 are connected to one another by being secured in equally spaced apertures 53 of a belt link 54. Multiple belt links 54 connect together, as shown in FIG. 9, to form a continuous belt loop. A link spacer 55 is located between opposed apertures 53 of belt link 54. Core retention element 52 comprises a transfer cog 56 housing a core holder 57 and a core push pin 58. Core retention element 52 fits through opposed apertures 53 of belt link 54, causing transfer cog 56 to be partially surrounded by chain spacer 55. A snap ring 59 mates with a base of transfer cog 56 that will be located below a bottom aperture of opposed apertures 53, when core retention element 52 is placed through opposed apertures 53. By virtue of snap ring 59 and a flange portion of transfer cog 56 that rests on or near a top aperture of opposed apertures 53, each core retention element 52 remains in position. Different shapes and sizes of core holder 57 and core push pin 58 may be housed in transfer cog 56 to accommodate tablet cores of varying sizes. Other constituent parts of core press assembly 10, such as, but not limited to, bowl top 32 and tablet insert chute 27, may likewise be adjusted or replaced to accommodate tablet cores of varying sizes.

A belt link 54 and chain spacers 55 are utilized to connect a plurality of transfer cogs 56. A plurality of gears 64 having cogs that project between chain spacers 55 are positioned to help move and/or guide transfer assembly 50 when it is moved by upper punches 78 of press turntable 70. The cogs on each of plurality of gears 64 are spaced to fit between chain spacers 55 and to help appropriately guide transfer assembly 50 along its continuous loop. In some embodiments, the plurality of gears 64 may additionally or alternatively drive the plurality of transfer assemblies 50. In some embodiments, shaped surfaces with a low frictional coefficient may be provided in lieu of plurality of gears 64 to help guide transfer assembly 50. Also in some embodiments, the plurality of core retention elements 52 may have a different configuration for transporting tablet cores and may be connected otherwise than with belt 54 to form transfer assembly 50. Vacuum 43 may also be provided in some embodiments near the inner periphery of bowl top 32, at a position where tablet cores are not retained in notch 34, in order to suck and/or blow any debris from bowl top 32.

When transfer assembly 50 is moved by upper punches 78 of press turntable 70 or otherwise, the bowl top 32 is also rotated. In some embodiments, the core retention elements 52 interact with a plurality of equally spaced teeth 40 positioned between core feed apertures 35 to cause bowl top 32 to rotate. Twenty teeth 40 are provided in the embodiment of bowl top 32 shown. During at least a portion of the period when core retention elements 52 interact with bowl top 32 to cause it to rotate, one or more core retention elements 52 will be positioned above one or more corresponding core feed apertures 35.

The push pins 36 are located below bowl top 32 and in line with each notch 34 and each core feed aperture 35. At some point while core retention elements 52 are so positioned, the rotation of bowl top 32 causes push pins 36 to contact push pin cam 38. Push pin cam 38 gradually forces each push pin 36 in an upward direction. Each push pin 36 then contacts one tablet core 1 held in bowl top 32 in line with each push pin 36. Each push pin 36 also forces each tablet core 1 through each core feed aperture 35 and into core retention element 52, where it is temporarily retained by core holder 57. In some embodiments, each inward facing groove 33, tablet trap 37, and each push pin 36 help maintain each tablet core 1 in line with its corresponding core feed aperture 35 from the time each tablet core 1 is released from tablet insert chute 27 until the time each tablet core 1 has been communicated to core retention element 52.

With continuing reference to FIGS. 3 and 8, once a tablet core 1 is transferred to a core retention element 52, it is retained in core holder 57. During which, core retention element 52 moves across a relatively smooth, preferably Teflon coated, surface 44 towards one of a plurality of die bores 72 of press turntable 70. When a tablet core 1 is inserted into core retention element 52, core push pin 58 is caused to be displaced at least somewhat out of core holder 57 as shown in FIG. 8.

Figure 10:
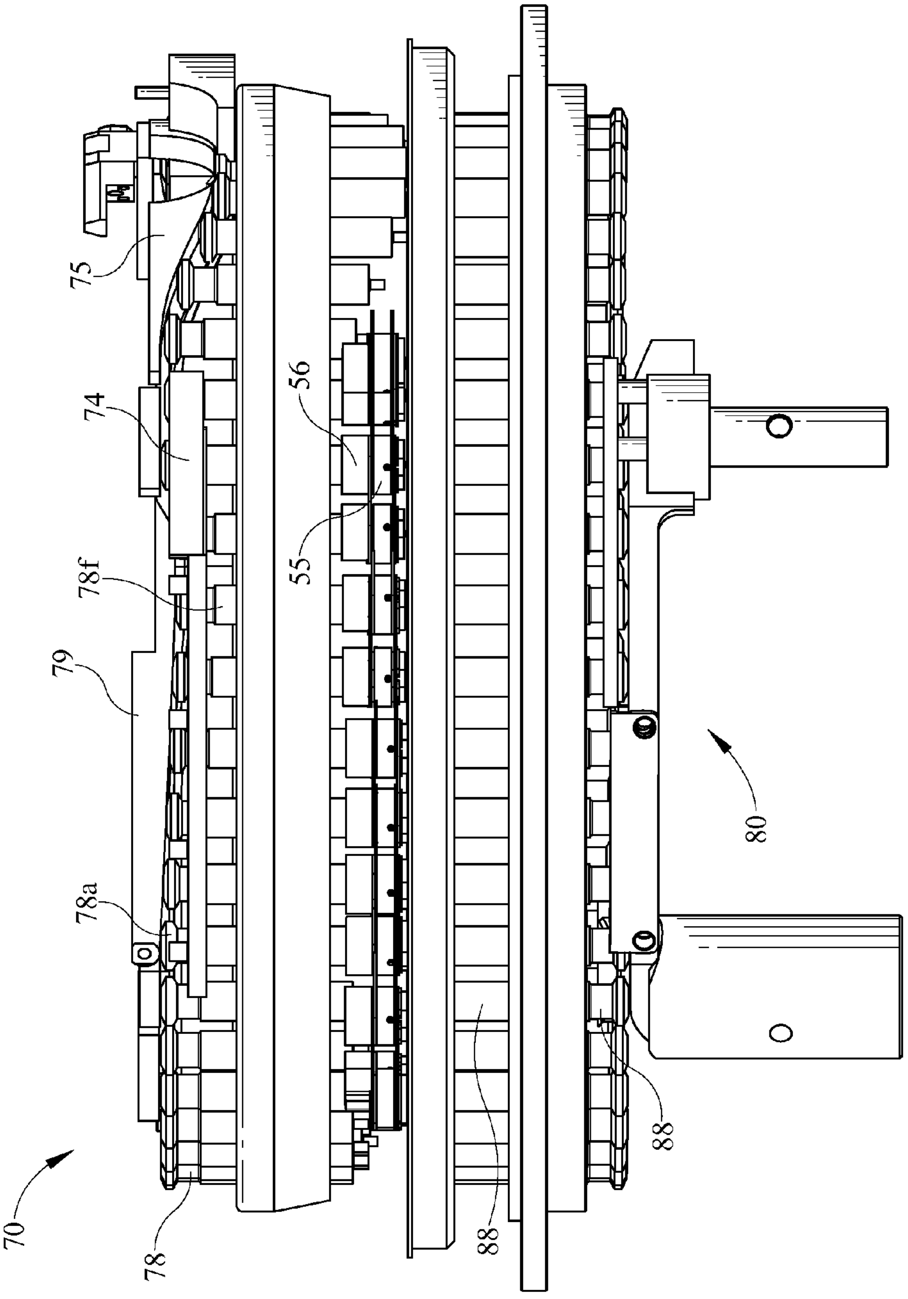
FIG. 10 is a side view of the press turntable of FIG. 3 with a portion of the transfer assembly of FIG. 3 shown.
Figure 11:
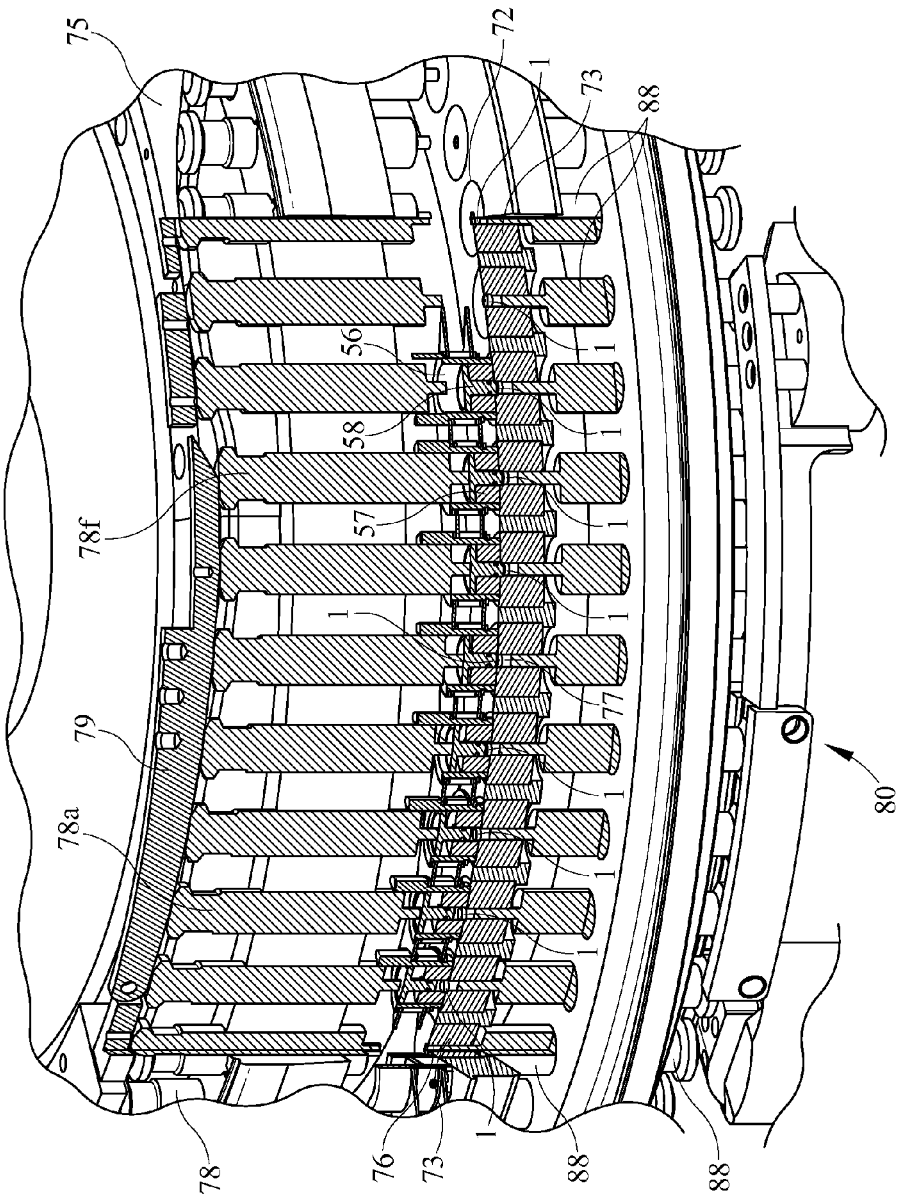
FIG. 11 is a top perspective view of a portion of the press turntable of FIG. 3 with a portion of the transfer assembly of FIG. 3, shown with a partial section of the press turntable and transfer assembly.

With reference to FIGS. 10 and 11, each core retention element 52 is eventually positioned above and synchronized with a die bore 72 of press turntable 70. Each die bore 72 retains an interchangeable die 73 that comprises a powder bore 76. The dies 73 are interchangeable to accommodate a variety of powder bore 76 sizes and geometries. As shown in FIG. 11, each powder bore 76 has been prefilled with a bed of powder 77 or the like by means generally known in the art. Each bed of powder 77 may be communicated from powder feed 14 into each powder bore 76 and tamped down prior to being positioned proximal to core retention element 52. The upper punch 78 and the powder bore 76 are substantially aligned about a common vertical axis (not shown).

In some embodiments, at least a portion of the travel of an upper punch 78 and a corresponding core retention element 52 may be synchronized, such that punch 78 and core retention element 52 are substantially aligned along a vertical axis (not shown). The core retention elements 52 are directed into alignment with the upper punch 78 and powder bore 76. As the upper punch 78 moves along (from left to right when viewing FIG. 11), it comes in contact with transfer cog 56. Transfer cog 56 is generally cylindrical in shape with an opening to allow an upper punch 78 to enter the cylinder. As the upper punch 78 moves into the cylinder, at least a portion of the transfer cog 56 contacts a leading surface of the upper punch 78. This interaction transfers a force from the upper punch 78 to the transfer cog 56 thereby moving the transfer cog in synchronization with the upper punch 78.

As the core retention element 52, powder bore 76, and upper punch move along, the upper punch 78 contacts the upper punch tamp cam 79. This contact pushes the upper punch 78 down to contact the core push pin 58. As a result, core push pin 58 is driven down and contacts tablet core 1, causing it to be discharged from core holder 57 and onto the corresponding powder bore 76 and powder bed 77. In some embodiments, upper punch 78 is gradually driven down over a number of stages onto core push pin 58 and gradually places any tablet core retained by transfer cog 56 into a bed of powder in its respective die bore 72. For example, upper punch tamp cam 79 may be gradually sloped such that it drives a given upper punch 78 down over a plurality of stages. Thus, at any given time six consecutive upper punches 78 would be contacting and being forced down by upper punch tamp cam 79, with a leading upper punch **78*f* being driven down the farthest and a trailing upper punch 78*a* driven down the least. This allows any tablet core 1 to be more slowly and accurately discharged from core holder 57 than if each upper punch 78** is driven down more quickly, such as over only one stage.

A plurality of lower punches 88 are also preferably provided that coincide with and are substantially in line with each upper punch 78. In some preferred embodiments one end of each lower punch 88 forms the base of each powder bore 76. In these embodiments, a lower cam track 80 may be provided. At least a portion of the lower cam track 80 may be gradually sloped to contact and pull down each lower punch 88. The lower punch 88 is pulled down as its corresponding upper punch 78 is driven down onto core push pin 58 and a tablet core 1 is discharged into powder bore 76. Pulling lower punch 88 down increases the volume of the powder bore 72. Thus, allowing room for any powder present in die bore 72 that may be displaced by insertion of a tablet core 1.

This gradual placement of a tablet core 1 over several stages ensures accurate placement of a tablet core 1 in die bore 72 and in the bed of powder present in die bore 72. Moreover, gradual placement of tablet core 1 and the use of lower cam track 80 enables a tablet core to be accurately placed in a variety of positions in the bed of powder and resultantly in the finished tablet. Upper punches 78 may contact upper punch tamp cam 79 over a number of stages besides six, the number of which may depend on a variety of factors, such as, but not limited to, the size of tablet core and the size of the finished tablet.

After an upper punch 78 has been driven down by upper punch tamp cam 79 and caused core push pin 58 to discharge a tablet core, the upper punch 78 is lifted out of the corresponding transfer cog 56, such as by lifting track 74. Core retention element 52 then continues in a loop towards internal feed wheel assembly 30 and bowl top 32 to be refilled with another tablet core 1. The upper punch 78 and its corresponding powder bore 76 and lower punch 88 then preferably continue around press turntable 70 for further processing. In some embodiments, the given powder bore 76 is filled with an additional quantity of powder or the like, preferably by virtue of powder communicated from powder feed 15. Then, each upper punch 78 encounters an upper punch cam 75 that forces upper punch 78 downward into powder bore 76 and compresses tablet core 1 and any present powder between upper punch 78 and lower punch 88 into a singular tablet.

The foregoing description of structures and methods has been presented for purposes of illustration. It is not intended to be exhaustive or to limit the invention to the precise steps and/or forms disclosed, and obviously many modifications and variations are possible in light of the above teaching. It is understood that while certain forms of the core press assembly have been illustrated and described, it is not limited thereto except insofar as such limitations are included in the following claims and allowable functional equivalents thereof.

I claim:

1. A transfer assembly for transfer of cores in a press assembly, the press assembly having a plurality of rotating upper punches at least selectively aligned with a plurality of rotating die bores, the transfer assembly comprising:

a plurality of core retention elements coupled to one another to form a loop, each of one or more of the core retention elements comprising:

a core receptacle disposed about an axis, the core receptacle configured to receive a core therein through a core opening of the core receptacle;

a core push pin at least selectively extending into said core receptacle, said core push pin movable within said core receptacle along said axis;

a transfer cog extending in a direction that is upward and away from the opening of the core receptacle;

wherein the upper punches of the press assembly selectively contact the transfer cogs of the one or more core retention elements to rotate the transfer assembly and sequentially align the core receptacles of the one or more core retention elements with the die bores of the press assembly.

2. The transfer assembly of claim 1, wherein the upper punches of the press assembly selectively contact the core push pins of a plurality of the core retention elements to move each of the core push pins along a respective said axis.

3. The transfer assembly of claim 1, wherein the core retention elements are secured in equally spaced apertures.

4. The transfer assembly of claim 3, wherein the equally spaced apertures are provided in multiple belt links coupled to one another to form the continuous belt loop.

* * * * *